Patented Feb. 5, 1946

2,394,359

UNITED STATES PATENT OFFICE 2,394,359

TERPENE DERIVATIVES

Joseph N. Borglin, Wilmington, Del., assignor to Hercules Powder Company, Wilmington, Del., a corporation of Delaware No Drawing. Application October 8, 1941, Serial No. 414,098

9 Claims. (Cl. 260—648)

This invention relates to a new stable non-volatile oil and to a method for its preparation; more particularly it is concerned with the preparation of such an oil from a monocyclic terpene monohydrohalide.

It is an object of this invention to provide a stable non-volatile oily material of a polymeric nature. It is also an object to prepare such a material from a monocyclic monohydrohalide or from an unsaturated monocyclic terpene hydrocarbon. It is also an object to prepare such a material from dipentene monohydrochloride or from dipentene. Other objects will appear.

According to this invention, these objects are obtained by treating a monocyclic monohydrohalide with a condensing agent until the desired product is formed, and recovering the product from the reaction mixture. The terpene monohydrohalide will be in the liquid state and may be utilized in solution or per se.

Monocyclic terpene monohydrohalides may be prepared, for example, by passing a dry hydrogen halide through a dry unsaturated terpene hydrocarbon or preferably through a solution of the dry hydrocarbon in a solvent such as carbon disulphide, carbon tetrachloride, ether, petroleum ether, benzene, carbon disulphide, chloroform, and the like, and vacuum distilling the resulting material. The monocyclic terpene monohydrohalide need not be in a pure state for the purposes of this invention. Thus, for example, impure dipentene such as a commercial terpene cut rich in dipentene, may be utilized for preparing dipentene monohydrochloride. In addition, the dipentene monohydrochloride may be in admixture with unreacted dipentene or other terpenes and may include some more highly chlorinated materials. In general, the dipentene or other monohydrochloride treated will have a chlorine content between about 15% and about 25%. For best results the chlorine content will be between about 19 and about 23% representing dipentene or other monocyclic terpene monohydrochloride of high purity since such a raw material leads to a higher yield of a desired product and, furthermore, gives products which are of higher stability and better color than products from an impure starting material.

The monohydrohalide most desirably utilized is dipentene monohydrochloride since it provides relatively high yields and a more valuable product than other terpene monohydrohalides. The invention will be described for convenience in terms of the use of dipentene monohydrochloride as exemplary of the procedure involved. However, the monohydrobromide, monohydroiodide or the monohydrofluoride of dipentene may be prepared and utilized in the same manner as the monohydrochloride. Similarly, the monohydrochloride, monohydrobromide, monohydroiodide, or monohydrofluoride of alpha-terpinene, beta-terpinene, gamma-terpinene, terpinolene, d-limonene, sylvestrene, phellandrene, and like monocyclic terpenes may be prepared and utilized in a like manner. The halide contents will be equivalent to those given hereinabove for the monohydrochlorides, i. e., monohydrobromides will have a bromine content between about 31% and about 41% (preferably between 34% and 38%) and monohydroiodides will have an iodine content between about 42% and 52% (preferably between 45% and 49%).

The reaction according to this invention may be carried out merely by mixing the condensing agent utilized with relatively pure dipentene monohydrochloride. However, the dipentene monohydrochloride may be in solution form and in some cases the regulating effect of solvents is desirable. Suitable solvents for the purposes are, for example, such chlorinated hydrocarbon solvents as methyl chloride, methylene chloride, chloroform, ethyl chloride, ethylene chloride, 1-1 dichlorethane, 1-1-2 trichlorethane, acetylene tetrachloride, propylene chloride, isopropyl chloride, and the like; such hydrocarbon solvents as benzene, toluene, xylene, pentane, hexane, octane, petroleum ether and the like; ethyl acetate, methyl acetate, etc. Solvents in general have a regulating effect upon the course of the reaction and in some cases cooperate with the condensing agent in bringing about the desired reaction; for example, chlorinated solvents such as those mentioned are preferably utilized when the condensing agent is aluminum chloride or other aluminum halide. Hydrocarbon solvents such as benzene and other materials of this class mentioned find desirable application when the condensing agent is boron trifluoride. Solvents possess little or no advantage when the condensing agent is an active earth such as Fuller's earth.

The condensing agent utilized may be an acid acting condensing agent, for example, acid acting halides of amphoteric elements such as aluminum chloride, aluminum bromide, boron trifluoride, stannic chloride, zinc chloride, silicon tetrachloride, and the like, or sulphuric acid, phosphoric acid, and the like; or it may be an active earth or other mineral substance such as Fuller's earth, activated Fuller's earth, activated alumina, silicious or argillaceous earths or clays, vermiculite, and the like.

The reaction may be carried out at any temperature in the range between about −50° C. and about 200° C. and preferably will be carried out in the range between about 0° C. and about 150° C. The time required for the reaction varies with the temperature and the condensing agent used and may be as little as one hour or as much as 60 hours or more. However, under usual conditions of operation a period of from about four to about eight hours is sufficient where no reaction solvent is utilized and a period of about 24 to about 48 hours is sufficient where a regulating solvent is used. After the reaction has been continued to completion or to the desired extent, the product is recovered from the reaction mixture. Where solid material is present, this may be filtered from the reaction mixture and in some cases, for example, where an active earth is utilized, this may complete the recovery. Usually catalytic materials are removed by washing the product or product solution with water. The water is preferably acidified with hydrochloric acid, sulfuric acid, or the like, since by this procedure, precipitation of catalyst products is avoided. However, alkaline washes may be used where precipitates are not objectionable or where no precipitate is formed from the catalyst by the procedure. The reaction product so treated will then usually be washed with pure water.

Volatile materials such as solvents and unreacted dipentene monohydrochloride may then be removed by vacuum distillation. A desirable procedure comprises heating the reaction product mixture after removal of the catalyst to temperatures up to about 105° C. to about 120° C. at an absolute pressure of 10 mm., distilling off volatile materials in this manner. The material remaining is the stable non-volatile product according to this invention. If desired, this product may be treated to reduce any color present by absorbents such as charcoal, Fuller's earth, and the like, preferably utilizing solutions of the product in such a treatment. Where an activated earth or a boron fluoride is utilized as the condensing agent, a light colored product is usually obtained and no decolorizing treatment is necessary. This is also true to some extent where the reaction has been carried out in an inert, i. e., non-oxidizing atmosphere, such as is provided by a blanket of carbon dioxide, hydrogen, nitrogen, or the like.

The product in accordance with this invention is a stable, oily, more or less viscous, liquid. It is distinctly more viscous than the starting material and may have a viscosity varying from 100 centipoises to about 5,000 centipoises. The color of the material varies from a white through a very pale yellow which is substantially colorless to a dark brown, depending upon the purity of the raw material, the catalyst utilized and the conditions of reaction. The product is non-volatile by which is meant that it does not distill at temperatures up to 105° C., at an absolute pressure of 10 millimeters of mercury. The material is quite stable and resistant to darkening under the ordinary conditions of atmospheric oxidation and light and is characterized by being substantially non-drying in nature, i. e., no appreciable drying occurs upon exposing a film poured on a glass plate for one week to ordinary atmospheric conditions.

The products in accordance with this invention have a variable chlorine or other halide content varying from a very small quantity to appreciable quantities which, however, are always less than that of the dipentene monohydrochloride or other terpene monohydrohalide reacted. The chlorine content depends largely upon the catalyst and conditions of reaction employed, and may vary from about 0.1% to about 12% by weight. Where catalysts like aluminum chloride and Fuller's earth are employed, the chlorine content will be between about 0.1% and about 5% by weight. However, when a fluoride of boron is employed as the condensing agent, the chlorine content will vary between about 5% and about 12% and will usually be of the order of 9–10%. Where a halide other than a chloride is involved in the process, the halogen content of the product will be molecularly equivalent to the chlorine content mentioned.

The process in accordance with this invention is illustrated by the following specific examples of embodiments thereof.

*Example 1*

Dipentene monohydrochloride was prepared by passing dry hydrogen chloride through a solution of dry dipentene in carbon disulfide and fractionating the resulting material at an absolute pressure of 10 mm. of mercury. A fraction distilling over at 90–105° C. at 10 mm. and having a chlorine content of 9.9% by weight was utilized in this example. Thirty parts by weight of the dipentene monohydrochloride fraction mentioned were dissolved in 200 parts by weight of ethylene chloride and mixed with 3 parts by weight of aluminum chloride. This mixture was then permitted to stand for 48 hours after which it was refluxed for 3 hours. The resulting solution was cooled, thoroughly washed with water, and filtered. The ethylene chloride was then distilled off. The remaining material was then subjected to distillation at an absolute pressure of 10 mm. at a temperature of 85–105° C. The residue was a dark oily liquid having a chlorine content of 0.25% by weight and a refractive index of 1.5420. The material recovered represented a yield of 50% of the starting raw material.

*Example 2*

In this example dipentene monohydrochloride was prepared as set forth in Example 1 with the exception that a fraction distilling in the range of 105–120° C. at an absolute pressure of 10 mm. and having a chlorine content of 22.1% was utilized. This fraction was treated in the manner described in Example 1 to prepare the non-volatile liquid product. In this case the yield of material was 62% of the material started with. The product had a chlorine content of 0.5% by weight and a refractive index of 1.5327.

*Example 3*

Dipentene monohydrochloride having a chlorine content of 9.9% and representing a fraction the same as that treated in Example 1 was heated with fuller's earth for 8 hours at a temperature of 150° C., utilizing 38 parts of the dipentene monohydrochloride and 5 parts of the fuller's earth. The resulting product was filtered and then subjected to distillation up to a temperature of 105° C. at an absolute pressure of 10 mm. The polymeric product so obtained represented 50% of the starting material and had a chlorine content of 0.8% and a refractive index of 1.5223. It was light in color.

Example 4

A fraction of dipentene monohydrochloride similar to that utilized in Example 2 having a chlorine content of 22.1% was treated with fuller's earth in the manner set forth in Example 3, including filtration and then vacuum distillation to remove materials volatile at less than 105° C. at an absolute pressure of 10 mm. A yield of 77% by weight of the starting material was obtained. The product was light in color, had a chlorine content of 1.3% and a refractive index of 1.5203.

Example 5

Dipentene monohydrochloride having a chlorine content of 20% was dissolved in an equal weight of benzene. One hundred parts by weight of this solution were treated with 2 parts by weight of boron trifluoride by bubbling the gas into the solution. The solution was then permitted to stand for 2 days after which it was thoroughly washed with water and the benzene removed by evaporation. The resulting product was recovered by fractionation under vacuum to remove volatile components and a residual product in a yield of 66% of the original material was obtained. This product had a chlorine content of 9.7% and refractive index of 1.5156.

Example 6

Dipentene monohydrobromide was prepared by passing dry hydrogen bromide through a 50% solution of commercial dipentene in carbon tetrachloride for one hour. The material resulting was fractionated under vacuum to remove volatile materials. The product remaining was a light yellow liquid, chiefly dipentene monohydrobromide, having a bromide content of 34% by weight. Fifty parts by weight of this material were heated for 12 hours at 150° C. with 5 parts by weight of fuller's earth. The resulting material was filtered and heated under vacuum to remove any volatile materials present. In this manner, 24 parts of a yellow liquid product containing 0.4% of bromide were obtained.

Example 7

Terpinene monohydrochloride was prepared by following the procedure hereinbefore given in Example 1 for the preparation of dipentene monohydrochloride. A fraction consisting of the material non-volatile at 105° C. under vacuum and having a 20% by weight content of chloride was obtained. Twenty-five parts by weight of the fraction were mixed with 3 parts by weight of aluminum chloride in 200 parts of ethylene dichloride. The mixture was agitated at room temperature (25° C.) for 72 hours and then heated to boiling and refluxed for one hour. The resulting solution was thoroughly washed with water, filtered, and the filtrate submitted to vacuum dissolution to remove ethylene dichloride and any other volatile material present. The resulting residue was a dark, oily, yellow material containing 0.4% chloride.

The products in accordance with this invention are useful as non-volatile solvents, for example, in fixing perfumes. They are of particular value as plasticizers for resins and other plastic compositions and have utility in lubricating textiles.

It will be understood that the details and examples hereinbefore set forth are illustrative only and that the invention as broadly described and claimed is in no way limited thereby.

What I claim and desire to protect by Letters Patent is:

1. The process of producing a stable nonvolatile oil characterized by having a viscosity between about 100 cps. and about 5000 cps. and a halogen content up to about 12%, and by being substantially stable and resistant to ordinary atmospheric oxidation and light, nonvolatile below 105° C. at a pressure of 10 mm. of mercury, and substantially nondrying, which comprises subjecting a monohydrohalide of a monocyclic terpene hydrocarbon at a temperature between about —50° C. and about 200° C. for about 1 hour to about 60 hours to the action of a catalyst selected from the group consisting of aluminum chloride and boron trifluoride.

2. The process of producing a stable nonvolatile oil characterized by having a viscosity between about 100 cps. and about 5000 cps. and a halogen content between about 5% and about 12%, and by being substantially stable and resistant to ordinary atmospheric oxidation and light, nonvolatile below 105° C. at a pressure of 10 mm. of mercury, and substantially nondrying, which comprises subjecting a monohydrohalide of a monocyclic terpene hydrocarbon at a temperature between about —50° C. and about 200° C. for about 1 hour to about 60 hours to the action of boron trifluoride.

3. The process of producing a stable nonvolatile oil characterized by having a viscosity between about 100 cps. and about 5000 cps. and a chlorine content up to about 12%, and by being substantially stable and resistant to ordinary atmospheric oxidation and light, nonvolatile below 105° C. at a pressure of 10 mm. of mercury, and substantially nondrying, which comprises subjecting dipentene monohydrochloride at a temperature between about —50° C. and about 200° C. for about 1 hour to about 60 hours to the action of a catalyst selected from the group consisting of aluminum chloride and boron trifluoride.

4. The process of producing a stable nonvolatile oil characterized by having a viscosity between about 100 cps. and about 5000 cps. and a chlorine content between about 5% and about 12%, and by being substantially stable and resistant to ordinary atmospheric oxidation and light, nonvolatile below 105° C. at a pressure of 10 mm. of mercury, and substantially nondrying, which comprises subjecting dipentene monohydrochloride at a temperature between about —50° C. and about 200° C. for about 4 to about 8 hours to the action of boron fluoride.

5. The process of producing a stable nonvolatile oil characterized by having a viscosity between about 100 cps. and about 5000 cps. and a chlorine content between about 5% and about 12%, and by being substantially stable and resistant to ordinary atmospheric oxidation and light, nonvolatile below 105° C. at a pressure of 10 mm. of mercury, and substantially nondrying, which comprises subjecting a benzene solution of dipentene monohydrochloride at a temperature between about —50° C. and about 200° C. for about 24 to about 48 hours to the action of boron trifluoride.

6. The process of producing a stable nonvolatile oil characterized by having a viscosity between about 100 cps. and about 5000 cps. and a chlorine content between about 0.1% and about 5%, and by being substantially stable and resistant to ordinary atmospheric oxidation and light, nonvolatile below 105° C. at a pressure of 10 mm. of mercury, and substantially nondrying, which comprises subjecting dipentene monohydrochloride at a temperature between about —50° C. and about 200° C. for about 1 hour to about 60 hours to the action of aluminum chloride.

7. The process of producing a stable nonvolatile oil characterized by having a viscosity between about 100 cps. and about 5000 cps. and a chlorine content between about 0.1% and about 5%, and by being substantially stable and resistant to ordinary atmospheric oxidation and light, nonvolatile below 105° C. at a pressure of 10 mm. of mercury, and substantially nondrying, which comprises subjecting an ethylene chloride solution of dipentene monohydrochloride at a temperature between about —50° C. and about 200° C. for about 24 to about 48 hours to the action of aluminum chloride.

8. A stable nonvolatile oil characterized by having a viscosity between about 100 cps. and about 5000 cps. and a halogen content up to about 12%, and by being substantially stable and resistant to ordinary atmospheric oxidation and light, nonvolatile below 105° C. at a pressure of 10 mm. of mercury, and substantially nondrying, said oil being formed by subjecting a monohydrohalide of a monocyclic terpene hydrocarbon at a temperature between about —50° C. and about 200° C. for about 1 hour to about 60 hours to the action of a catalyst selected from the group consisting of aluminum chloride and boron trifluoride.

9. A stable nonvolatile oil characterized by having a viscosity between about 100 cps. and about 5000 cps. and a chlorine content between about 5% and about 12%, and by being substantially stable and resistant to ordinary atmospheric oxidation and light, nonvolatile below 105° C. at a pressure of 10 mm. of mercury, and substantially nondrying, said oil being formed by subjecting dipentene monohydrochloride at a temperature between about —50° C. and about 200° C. for about 1 hour to about 60 hours to the action of boron trifluoride.

JOSEPH N. BORGLIN.